US008287735B2

(12) United States Patent
Hanemaaijer et al.

(10) Patent No.: US 8,287,735 B2
(45) Date of Patent: Oct. 16, 2012

(54) MEMBRANE DISTILLATION METHOD FOR THE PURIFICATION OF A LIQUID

(75) Inventors: Jan Hendrik Hanemaaijer, Oosterbeek (NL); Albert Edward Jansen, Utrecht (NL); Jolanda Van Medevoort, Ede (NL); Hans De Jong, Hengolo (NL); Eric Van Sonsbeek, Hulst (NL); Engelbert Peter Jurrie Jan Koele, Apeldoorn (NL); Jan Willem Assink, Apeldoorn (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 473 days.

(21) Appl. No.: 12/447,304

(22) PCT Filed: Oct. 31, 2007

(86) PCT No.: PCT/NL2007/050524
§ 371 (c)(1),
(2), (4) Date: Nov. 9, 2009

(87) PCT Pub. No.: WO2008/054207
PCT Pub. Date: May 8, 2008

(65) Prior Publication Data
US 2010/0072135 A1 Mar. 25, 2010

(30) Foreign Application Priority Data
Oct. 31, 2006 (EP) .................................... 06076956

(51) Int. Cl.
*B01D 15/00* (2006.01)
*B01D 35/00* (2006.01)
*B01D 3/00* (2006.01)
*B01D 3/10* (2006.01)

(52) U.S. Cl. ............ 210/640; 95/52; 210/175; 210/180; 203/10; 202/81; 202/176

(58) Field of Classification Search .................. 210/640, 210/175, 180; 203/10; 202/81, 176, 195; 95/52
See application file for complete search history.

(56) References Cited

U.S. PATENT DOCUMENTS
3,340,186 A 9/1967 Weyl
(Continued)

FOREIGN PATENT DOCUMENTS
DE 3123409 12/1982
(Continued)

OTHER PUBLICATIONS
K. Schneider, T.J. van Gassel, Membrandestillation, Chem. Ing. Tech. 56 (1984) 514-521.
(Continued)

*Primary Examiner* — Ana Fortuna
(74) *Attorney, Agent, or Firm* — Renner, Otto, Boisselle & Sklar, LLP (57) ABSTRACT

The invention provides a method for the purification of a liquid by membrane distillation comprising: passing a heated vapourising stream of a liquid (retentate stream) through a retentate channel along a porous hydrophobic membrane (10), whereby vapour of the liquid flows via the pores of the membrane to the other side of said membrane, and condensing said vapour on the other side of said membrane to give a distillate stream in a distillate channel (5) which distillate is created by passing the heat of condensation (latent heat) towards a condenser surface (3), said condenser surface forming a non-porous separation between a feed stream of the liquid to be purified and said distillate stream, which feed stream is passed through a feed channel (2) in counter-current with the retentate stream, in which feed channel a space material (4) is arranged whereby at least part of the latent heat is transferred via the condenser surface to the feed stream, and whereby a positive liquid pressure difference is applied between the retentate stream and the feed stream at the corresponding points of the retentate channel and the feed channel over at least a part of each of the retentate channel (9) and feed channel. The invention further provides an apparatus suitable for use in said method.

19 Claims, 6 Drawing Sheets

U.S. PATENT DOCUMENTS

| | | | |
|---|---|---|---|
| 4,545,862 | A | 10/1985 | Gore et al. |
| 4,879,041 | A | 11/1989 | Kurokawa et al. |
| 5,062,927 | A * | 11/1991 | Stout .............................. 203/89 |
| 6,869,462 | B2 * | 3/2005 | TeGrotenhuis et al. ........... 95/51 |

FOREIGN PATENT DOCUMENTS

| | | |
|---|---|---|
| EP | 0 039 197 | 4/1981 |
| EP | 0 164 326 | 11/1985 |
| EP | 1 185 356 | 12/2003 |
| GB | 1 225 254 | 3/1971 |
| GB | 2 151 155 | 7/1985 |
| JP | 0-080994 A | 4/1991 |
| WO | 86/07585 | 12/1986 |
| WO | 00/72947 | 12/2000 |
| WO | 03/000389 | 3/2003 |

OTHER PUBLICATIONS

Design and field tests of a new membrane distillation desalination process.
C. M. Guyt, Influence of membrane properties and air gap on the performance of a membrane distillation module, Thesis University of Twente, 2003.
K.W. Lawson, D. R. Lloyd, Membrane distillation, Review, J. Membrane Science 124 (1997) 1-25.
International Search Report from corresponding International Application No. PCT/NL2007/050524 mailed Mar. 5, 2008.
Design and field tests of a new membrane distillation desalination process (Desalination 56 (1985), pp. 345-354).
C. M. Guyt, Influence of membrane properties and air gap on the performance of a membrane distillation module, Thesis University of Twente, 2003; K.W. Lawson, D. R. Lloyd, Membrane distillation, Review, J. Membrane Science 124 (1997) 1-25.

* cited by examiner

MEMBRANE DISTILLATION METHOD FOR THE PURIFICATION OF A LIQUID

This application is a national phase of International Application No. PCT/NL2007/050524 filed Oct. 31, 2007 and published in the English language.

The present invention relates to a method for the purification of a liquid by membrane distillation, in particular for the production of desalinated water from seawater or brackish water or process water, and an apparatus for carrying out such a method.

Membrane distillation differs from known distillation techniques such as multi-stage flash, multiple effect distillation and vapour compression in that a non-selective, porous membrane is used. This membrane forms a separation between the warm, vaporising retentate stream and the condensed product, the distillate stream. As a consequence of a suitable choice of material (usually polypropylene, polyethylene, polyvinylidenefluoride or polytetrafluorethene), the pores (diameter of between 0.00001 and 0.005 mm, usually between 0.0001 and 0.0005 mm) are not wetted by the liquid; only vapour passes through the membrane.

Membrane distillation was first described in U.S. Pat. No. 3,334,186. The intention was to improve the efficiency of seawater desalination by the use of an air-filled porous hydrophobic membrane. The method concerned here was so-called direct contact membrane distillation: a warm seawater stream and a cold distillate stream are both in direct contact with the membrane.

Substantial interest in membrane distillation was generated in the mid 1980s when a new generation of hydrophobic, highly porous membranes became available. However, research showed that membrane distillation is not less expensive than competitive techniques and therefore there was no commercial application.

A distinction can be made between four types of membrane distillation:
1. Direct contact membrane distillation (DCMD), where both the warm, vaporising stream and the cold condensate stream (distillate stream) are in direct contact with the membrane.
2. Air gap membrane distillation (AGMD), where the condenser surface is separated from the membrane by an air gap.
3. Sweeping gas membrane distillation (SGMD), where the distillate is removed in vapour form by an inert gas.
4. Vacuum membrane distillation (VMD), where the distillate is removed in vapour form by vacuum.

Up to now direct contact membrane distillation has attracted the most attention.

In this respect reference can, for instance, be made to U.S. Pat. No. 4,545,862 which describes both flat and spirally wound modules (with flat membranes). Such modules were tested for salt water desalination. For these tests the distillate stream was separated from the seawater stream fed in counter-current to the vaporising retentate and the seawater stream thus effectively absorbed the heat of condensation. In this patent an example is described in which a flow rate of 2.21 litres per m$^2$ total membrane surface area per hour is achieved with a temperature difference $\Delta T$ between the warm retentate and the seawater of 4° C., resulting in an energy consumption of only 212 kilo Joule per kg distillate produced. From these data, it can be calculated that the specific flux amounts to $1.30 \cdot 10^{-10}$ m3/m2·s·Pa, at a relatively high mean velocity in the retentate channel of 0.09 m/s. Specific flux is defined as the distillate flow rate per unit membrane surface area, per unit water vapour pressure difference between the bulk of the retentate and feed streams.

In addition to the use of flat membranes, the advantages of hollow fibre membranes for direct contact membrane distillation are known. As a result of the compact packing of membrane fibres, a surface area of up to 500 m$^2$ per m$^3$ can be obtained, which makes lower equipment costs possible. Furthermore, it has been proposed (see K. Schneider, T. J. van Gassel, Membrandestillation, Chem. Ing. Tech. 56 (1984) 514-521) to couple a direct contract membrane distillation module with a heat exchanger module in a cycle and thus to recover heat of condensation. Also, it is suggested to introduce a reduced air pressure inside the pores of DCMD, by degasification of the feed liquid and pumping out the distillate stream under sub-atmospheric pressure, which measures were shown to double the distillate flow rate. It was found that for seawater desalination a distillate flow rate of approximately 5 litres per m$^2$ per hour is obtained for a $\Delta T$ of 20° C. (5 kPa difference in vapour pressure) and a specific energy consumption of above 1,000 kJ per kg water.

Since 1984 there has been little discernible progress in the state of the art in respect of DCMD.

Air gap membrane distillation was first described in 1971 in GB 1 225 254 A. In addition to the use of an air gap, counter-current flow of feed and retentate (and thus recovery of latent heat), is already proposed. In addition, AGMD was described in 1982 in DE 3,123,409 (Siemens). This application relates to the use of a gap (with a thickness of 3 mm), filled with air, or optionally a lighter gas such as hydrogen, between a flat porous membrane and a cold condensation surface. The aim was to reduce the transport of perceptible heat by conduction through the membrane. It was established experimentally that heat transport by conduction was approximately equal to that by evaporation. Moreover, it was proposed to feed incoming seawater in counter-current to the vaporising stream and thus to recover heat. The use of solar heat as a source of heat was also claimed. A theoretical case was described in which a distillate flow rate of 3.36 kg per m$^2$ per hour was achieved with a temperature difference $\Delta T$ of 5° C., with a recovery of approximately 4.9% and an energy consumption of over 850 kJ per kilogram water produced.

European Patent Application 0 164 326 describes the use of an air gap with membrane distillation, the various features being constructed in the form of concentric tubes. A variant of this in which packets of flat membranes were used is described in the article "Design and field tests of a new membrane distillation desalination process (Desalination 56 (1985), pp. 345-354). It is striking that here the principle of counter-current flow of seawater and retentate is abandoned, as a result of which no recovery of heat of evaporation is possible. Energy consumption figures are then also not given. WO 8607585 A (1986) is based on the same model data which were used for above work, but deduces from these that an air gap thickness of 0.2 to 1.0 mm is needed in order to achieve both a high flow rate and a low loss of perceptible heat (target is 300-800 kJ/kg water). No account is taken in the model of temperature changes at and in the hot and cold walls, as a result of which a far too optimistic picture is painted.

In U.S. Pat. No. 4,879,041, air gap membrane distillation is described specifically for the preparation of ultra-pure water for the semiconductor industry. Here the effect of the thickness of the air gap, when using flat membrane sheets, on mass transport and heat transport was investigated in the region between 3 and 10 mm. It was concluded from these investigations that transport is determined by diffusion at thicknesses of less than 5 mm and by free convection at thicknesses of more than 5 mm. The performances measured were moderate: maximum distillate flow rates of 3.6 kg per m² per hour for a vapour pressure difference of approximately 20 kPa. Here again no heat of condensation is recovered and it is therefore also not surprising that a few years later there was a switch back to conventional multi-stage evaporation without membranes.

On the basis of this literature, it was concluded in EP 1 185 356 that the choice for an air gap system is not an obvious one when a low energy consumption is an important requirement. Recent literature teaches, however, that an air gap with or without vacuum is necessary to decrease the flow of sensible heat from the retentate stream towards the distillate and/or feed stream, in order to obtain a low energy consumption (C. M. Guyt, Influence of membrane properties and air gap on the performance of a membrane distillation module, Thesis University of Twente, 2003; K. W. Lawson, D. R. Lloyd, Membrane distillation, Review, J. Membrane Science 124 (1997) 1-25).

The aim of the present invention is, however, to achieve a breakthrough in the performance (specific flux, or distillate flow rate per unit membrane area per unit driving force) of direct contact membrane distillation and thus appreciably to reduce both the costs and the energy consumption of such a membrane distillation system.

Surprisingly, it has now been found that this can be established by means of a method in which—contrary to the state of the art—a special regime of liquid pressure inside the membrane distillation module is maintained.

Accordingly, the present invention relates to a method for the purification of a liquid by membrane distillation comprising:

passing a heated vapourising stream of a liquid (retentate stream) through a retentate channel along a porous hydrophobic membrane, whereby vapour of the liquid flows via the pores of the membrane to the other side of said membrane, and condensing said vapour on the other side of said membrane to give a distillate stream in a distillate channel which distillate stream is created by passing the heat of condensation (latent heat) towards a condenser surface, said condenser surface forming a non-porous separation between a feed stream of the liquid to be purified and said distillate stream, which feed stream is passed through a feed channel in counter-current with the retentate stream, in which feed channel a spacer material is arranged whereby at least part of the latent heat is transferred via the condenser surface to the feed stream, and whereby a positive liquid pressure difference is applied between the retentate stream and the feed stream at the corresponding points of the retentate channel and the feed channel over at least a part of each of the retentate channel and feed channel.

In accordance with the present invention a superior performance can be established. In this respect it is observed that a specific flux of higher than $1.5 \cdot 10^{-10}$ m3/m2·s·Pa can be established, which is typically around 50% higher then fluxes obtained at similar process conditions in known processes. Specific flux is defined as the distillate flow rate per unit membrane surface area, per unit water vapour pressure difference between the bulk of the retentate and feed streams.

Preferably, the positive liquid pressure difference between the retentate stream and the feed stream at the corresponding points of the retentate channel and the feed channel is applied over at least 50% of the total length of each of the retentate channel and feed channel, and more preferably over at least 75% of the total length of each of the retentate channel and feed channel.

In accordance with the present invention, particular attractive results are obtained when the porous membrane has a thickness in the range of from 50 to 1000 µm. Preferably, the porous membrane has a thickness in the range of from 100 to 600 µm, more preferably in the range of from 125 to 500 µm, and most preferably in the range of from 150 to 400 µm.

The retentate channels are delimited by porous hydrophobic membranes (porosity greater than 70% and preferably greater than 80% and pore size smaller than 2.0 µm, preferably between 0.01 and 0.5 µm). It will be appreciated that porous hydrophobic membranes are not wettable by a liquid. Hence, only a vapour, no liquids, can pass through such membranes. The membranes concerned can be commercially available membranes made of materials such as PTFE, PVDF, PP and PE and the like. The porous membranes to be used in accordance with the present invention can be laminated with other materials (e.g. non woven materials of PP, PET etc), which protect the membranes against abrasion, and/or give mechanical support. So-called asymmetric microfiltration and ultrafiltration membranes made of materials such as polyethersulphone, polysulphone, polyacrylonitrile, polyamides, etc. can also be used. In this context it is preferable to make the surface of these membranes completely or partially additionally hydrophobic, for example by means of a coating or other surface modification. In the simplest embodiment the retentate channels consist of flat membrane envelopes or hollow fibres or capillary membranes placed in parallel. The retentate flows through the inside of the envelopes or the lumen of these fibres/capillaries. When asymmetric membranes are used the active layer of the membrane, with the narrowest pores, is on the retentate side. The retentate channels can also be formed by flat plate membranes or membrane sheets, optionally in a spirally wound configuration.

The feed channels, through which the feed stream runs, are likewise preferably formed by flat envelopes or hollow fibres/capillaries made of either hydrophilic or hydrophobic material, placed in parallel. The walls of these channels are now non-porous, that is to say are not vapour-permeable or are barely vapour-permeable. Typically, said walls have a thickness typically between 10 and 2000 µm, preferably between 20 and 200 µm, either in sheet or fiber/capillary format. They can be made from polymeric materials (PP, PE, PET, nylons/PA, etc.; with or without filler-materials in order to e.g. improve the thermal conductivity), from metals (steel, Al, etc.), or from laminates of this materials, etc. Furthermore, the condenser material can be given such a shape that the resulting effective area for heat transfer is higher than the membrane area, e.g. by ribs, folds or other corrugations, by the use of a plurality of fibers/capillaries, etc.

In accordance with the present invention a spacer material is arranged in the feed channel. Preferably, the entire feed channel is filled with the spacer material. Suitably, in the retentate channel also a spacer material is arranged. Preferably, the entire feed channel is filled with the spacer material. In addition, if desired, inside the distillate channel also a spacer material can be arranged. In the respective channels the same type of spacer material or different types of spacer material may be applied. Suitably, in both the feed channel and the retentate channel a similar type of spacer material is applied. The spacer materials can suitably consist of nettings, technical fabrics and the like, made of woven or non woven filaments in various shapes, of polymers like PP, PE, EVA, etc. Suitable shapes include symmetrical squares, rectangles, diamonds, waves, etc.; also, asymmetrical shapes and filaments can be used. A preferred shapes of spacer material are non woven, diamond configurations.

The discharge of the distillate stream can take place via hydrophilic or porous material (such as a fabric, or rods) that has been applied inside the distillate channel. It is also possible to keep the distillate channels empty from other material than the produced water itself, and to discharge the distillate stream by pressure (built during production of the distillate), or by gravity, or by suction.

The method according to the invention can be implemented in a number of embodiments. Suitably, use can be made of flat membrane sheets or plates, optionally in a spirally wound configuration, or plate-like structures consisting of multiple capillary-like channels, to limit the flow channels for the retentate stream. Besides this, also hollow fiber or capillary arrays can be used. The same applies for the feed channels, in which the to be purified feed flows in counter-current with the retentate stream, and for the distillate channels, through which the condensate (distillate) flows either in co-current or in counter-current or crossflow etc. with the retentate stream.

These embodiments are usually constructed of several parallel envelopes or arrays of capillaries/hollow fibres, put together by suitable bonding techniques (pottings using suitable resins of epoxy, polyurethane etc; glues using e.g. polysiloxane, polyurethane, etc., either as one—or two/multi component formulations; hot melt materials; heat- or ultrasonic welding techniques; and all other techniques known to bonding experts.

In a first embodiment of the method in accordance with the present invention, the feed stream to be heated flows in virtually ideal counter-current to the vapourising retentate stream and the condensate distillate stream flows in co-current with the retentate stream and/or in counter-current to the feed stream, by which means the sensible heat of the distillate stream is recovered into the feed stream.

In respect of this embodiment it is noted that U.S. Pat. No. 4,545,862 describes a method wherein in both a flat and (preferably) a spirally wound module is applied, using flat hydrophobic and thin PTFE membranes. The method was tested for salt water desalination. For these tests the distillate stream was separated from the seawater stream fed in counter-current to the vaporising retentate and the seawater stream, thus effectively absorbing the heat of condensation. After testing two discharge options of the distillate stream, i.e. both from the cold side of the module (entrance of feed, outlet of retentate) and from the hot side of the module (outlet of feed, entrance of retentate), it was surprisingly found that performance (flux) of the module increased considerably when applying the first option. This was attributed to a "milking" effect, due to local deformation of the membrane material in a direction normal to the surface of the condenser sheet, which is stiffer than the exceedingly flexible and pliable membrane material, and so presses the latter partially into the spacer material (netting) which forms the retentate channel; and to the application of co-current flow of retentate and distillate streams, "forcing" the distillate to flow out. Further, in U.S. Pat. No. 4,545,862, the recovery of latent heat is achieved by counter-current flow of feed and retentate streams. Typically the feed is pumped into the feed channel under higher pressure than the pressure of the evaporating retentate stream entering the retentate channel.

Figure 3:
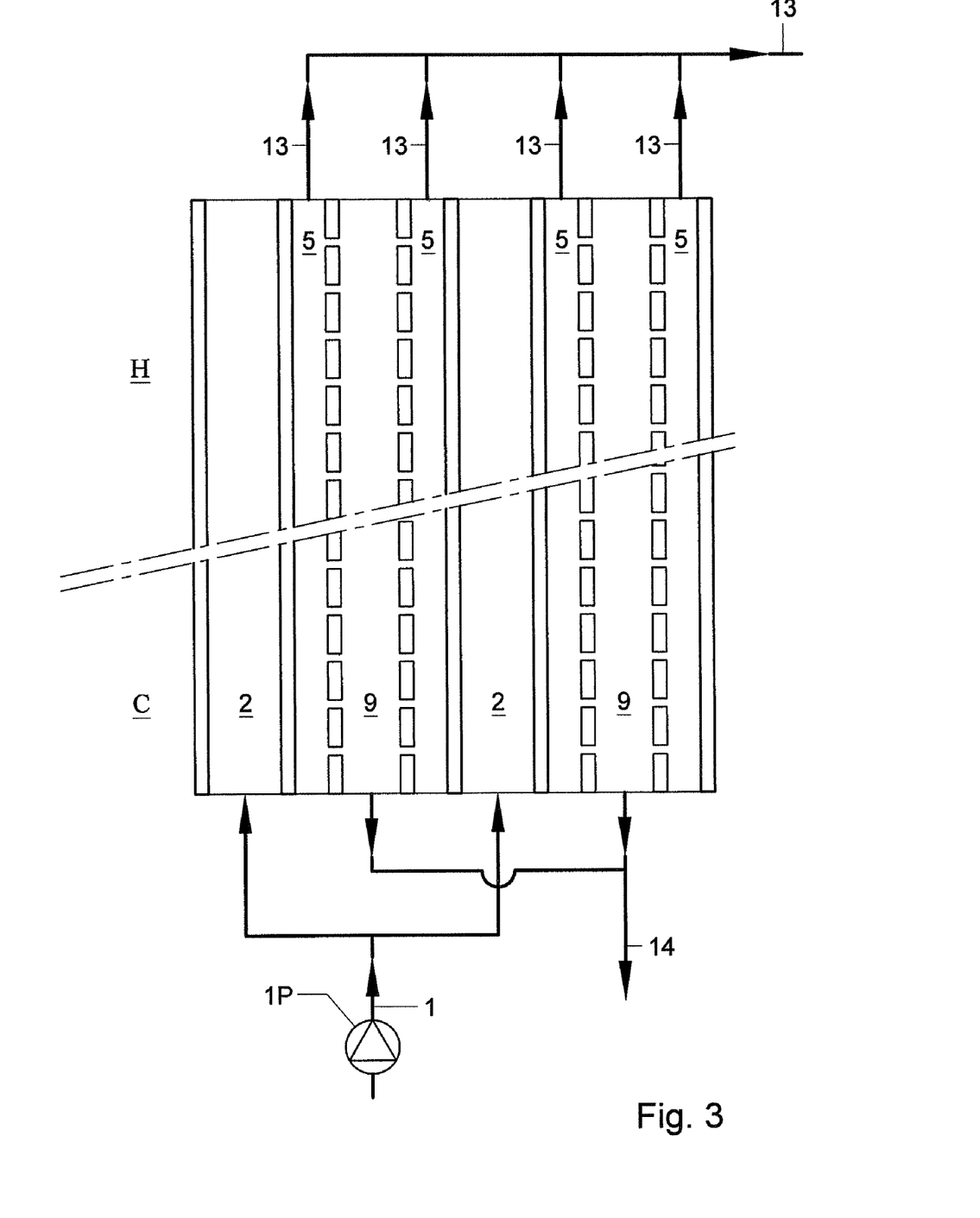

The present invention, however, differs essentially from the above-mentioned and known method in that use is made of a positive liquid pressure difference between the retentate stream and the feed stream at the corresponding points of each of the retentate channel and the feed channel over at least part of each of the retentate and feed channels. By doing so, the membrane will be pressed against the non-permeable condenser surface, or when applied against a distillate-discharging material placed between the condenser surface and the membrane. The condenser wall, on its turn, will be pressed against the spacer material placed inside the feed channel. It is noted that in U.S. Pat. No. 4,545,862 this configuration is not possible, as is shown in FIGS. 1A, 1B and 3, and described in column 6, line 52-line 63 and column 8, line 13-line 24 and line 42-line 68, because:

No spacer material is present in the feed channel 30.

The relatively stiff condenser sheet material 12 presses against the spacer material 54 in the retentate channel 20.

The forces acting in the direction normal to the condenser surface, as a result of pressure difference between feed and retentate, are always from the feed towards the retentate; only in that case the described "milking effect" is obtainable.

This essentially means that the liquid pressure difference between the retentate channel and the feed channel is always negative.

In the present invention the feed channel contains a spacer material, the condenser sheet material is pressed against this material by the positive liquid pressure difference between the retentate and feed channel, and by this a "milking effect" as described in U.S. Pat. No. 4,545,862 essentially is not possible to obtain. In addition, it is noted that the process according to the present invention cannot be carried out using the configuration as described in U.S. Pat. No. 4,545,862.

In another embodiment of the method in accordance with the present invention, inside the retentate channel a further channel is arranged through which a fluid is passed, whereby a positive liquid pressure difference is applied between the retentate stream and the fluid stream. Preferably, said fluid stream passes through the further channel in co-current direction with said retentate stream, and the fluid stream preferably comprises a residual heat stream (waste heat or heat derived from warm liquids, etc.). Preferably, the further channel comprises non-permeable walls, through which a hot fluid can suitably be pumped co-currently with said retentate stream, at a fluid pressure equal or preferably slightly higher than that of said retentate stream, inducing an extra, and thus advantageous, pressure on the feed/distillate/retentate channels.

This embodiment has the advantage that full use is made of the residual heat and that the driving force towards the inlet side of the feed stream is maintained by a rising temperature difference. The modules suitable for this can be of an extra compact and inexpensive construction.

In a further embodiment of the method according to the present invention, the distillate stream is discharged at the hot side of the distillate channel, thus in counter-current flow with the retentate stream. This variant has the advantage that hot distillate stream is produced, taking sensible heat away from the feed stream now flowing in co-current with the distillate stream, by which the feed stream can take up more latent heat, thus more vapour can be condensed, producing more distillate.

In yet another attractive embodiment of the method in accordance with the present invention, the distillate stream is discharged at the hot side of the distillate channel. Thus, the distillate stream is discharged in counter-current flow with the retentate stream. Suitably, and with or without extra heating, said distillate stream can be introduced in the further channel that is arranged within the retentate channel as described hereinbefore. This embodiment has the advantages that more distillate is produced at a given feed stream flow, and that the sensible heat taken from the feed stream is co-currently transferred to the retentate stream, thus reducing the amount of heat which has to be introduced for vapour formation, resulting in a very attractive reduction in the energy consumption in the method.

The present invention is particularly suitable for the desalination of seawater. Existing technologies for this, such as multi-stage flash distillation and reverse osmosis, have been optimised to virtually the maximum extent and because of too high an energy consumption and too high a level of investment per unit product are too expensive compared with on-shore purification production techniques. By use of the present invention spectacular results are achieved in respect of a high flow rate, a low heat loss, a very low energy consumption, a high water recovery, good water quality and a breakthrough in water production costs. The method is suitable for use at relatively low temperature (low-grade heat, waste heat, solar heat collectors, etc.). A substantial improvement in energy efficiency is anticipated, especially in the case of small-scale application.

The present invention also relates to an apparatus suitable for use in the method according to the present invention which apparatus comprises a segment comprising a feed channel in which a spacer material is arranged, a distillate channel and a retentate channel, whereby the segment has a first distribution chamber for a feed liquid to be supplied, a second distribution chamber located opposite the first distribution chamber for feed liquid to be discharged, a third distribution chamber for retentate stream to be supplied and a fourth distribution chamber opposite the third the third distribution chamber for the retentate stream to be discharged, whereby the segment is provided with a first pump for pumping the feed stream pressure into the segment and a second pump which is arranged downstream the second distribution chamber or downstream the heat exchanger for pumping out the retentate stream under higher pressure (related to the pressure inside the feed channels) into the heat exchanger and/or the distribution chamber of the retentate channels, the wall between the feed channel and the distillate channel comprises a condenser surface in the form of a non-porous membrane, and the wall between the retentate channel and the distillate channel comprises a porous membrane.

Preferably, the porous membrane has a thickness in the range of from 100 to 600 µm, more preferably in the range of from 125 to 500 µm, and most preferably in the range of from 150 to 400 µm.

In a very attractive embodiment of the present invention, the apparatus comprises a number of segments (modules) as described hereinabove which are connected in parallel to one another. In that case a first pump is suitably arranged upstream of the series of connected segments, whereas one or more further pumps is (are) suitably arranged downstream the series of connected segments or in between the respective segments that are connected to each other. It will be understood that one or more pumps can be applied in between the respective segments that are connected in parallel to each other, in order to control more accurately the pressures inside the retentate channels versus the pressure inside the feed channels.

In a very attractive embodiment, inside the retentate channel a further channel is arranged through which a fluid is passed, whereby the liquid pressure of the fluid stream is equal to or higher than the liquid pressure of the retentate stream. Preferably, said fluid stream passes through the further channel in co-current direction with said retentate stream, and fluid stream preferably comprises a residual heat stream. Preferably, the further channel comprises non-permeable walls, through which a hot fluid can suitably be pumped co-currently with said retentate stream, at a fluid pressure equal or preferably slightly higher than that of said retentate stream, inducing an extra, and thus advantageous, pressure on the membrane/distillate/condenser channels.

In another attractive embodiment, from one or both sides of the segments (modules) to be used, a pressure can be applied which is equal to or higher than the fluid pressure of the retentate stream. In this way, an additional pressure can advantageously be induced on the membrane/distillate/condenser channels. Said additional pressure can be established by using a means at one or both sides of the segment(s) to be used, of which means the volume can be increased by introducing into said means a suitable fluid (e.g. an oil, water, air or another gas). In this way, a balloon-type of structure can be obtained at one or both sides of the segment(s), which pressurised structure brings about the additional pressure on the membrane/distillate/condenser channels. It will be understood that such means will usually be made of a flexible material.

The present invention will now be described in more detail on the basis of FIGS. 1-5 in which various attractive embodiments of the present invention are shown.

Figure 1:
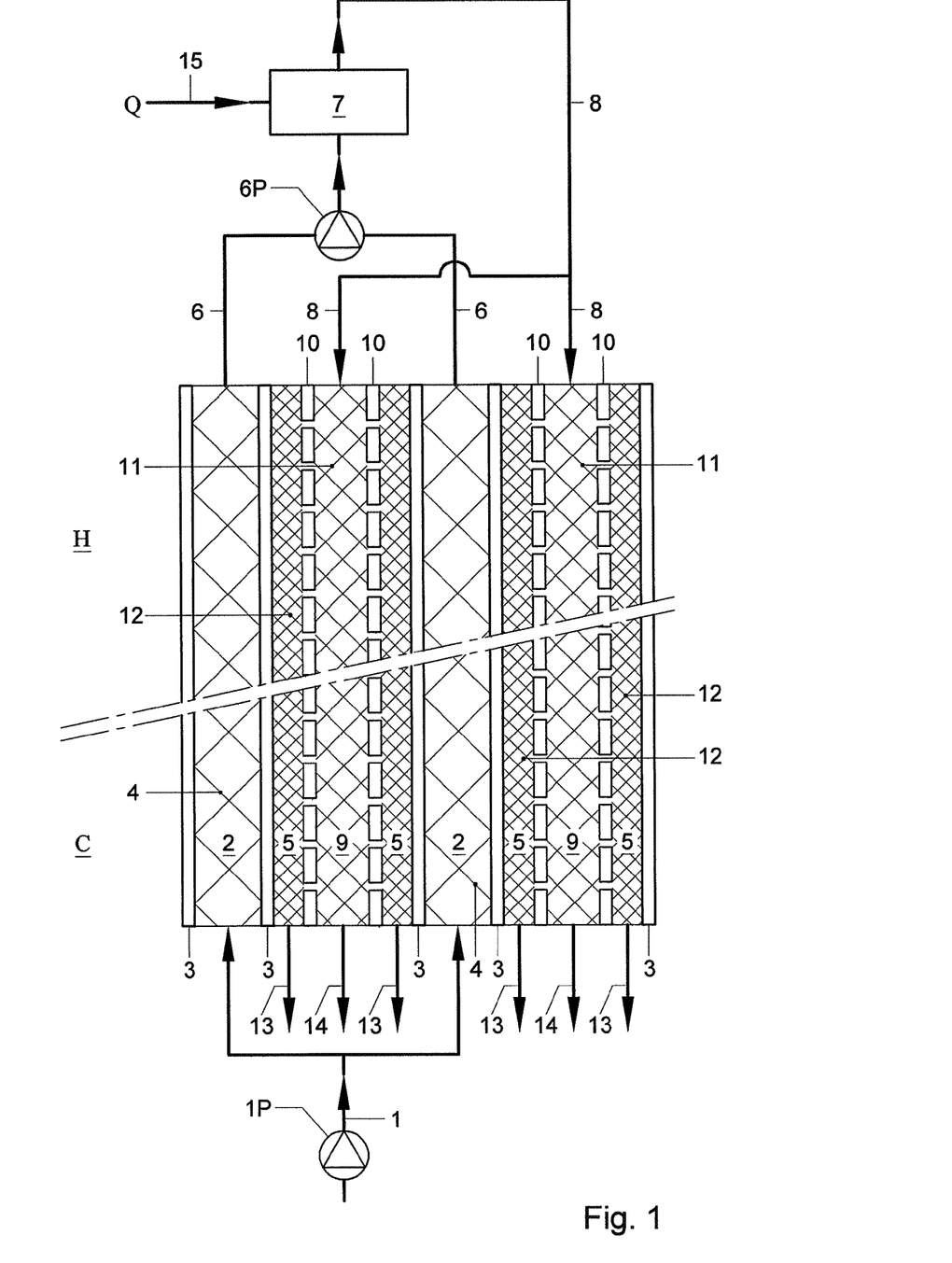

In FIG. 1, a plurality of parallel placed channels and materials called "module" is depicted according to the invention. The module is divided into a cold side C and a hot side H. A relatively cold feed stream 1 is pumped with feed pump 1P into the parallel feed channels 2, at the cold side C. These feed channels are constructed by the non-porous walls 3 and a spacer material 4. In these feed channels 2, the feed stream is heated by taking up heat from the warmer distillate channels 5 at the other side of the walls 3. So, gradually the feed stream becomes hotter and leaves the module as stream 6 at the hot side H, with the aid of pump 6P. This pump ensures by suction that the pressure in the feed channels 2 is relatively low; typically between 0.1 and 3.0 bara (absolute pressure). The relatively hot feed stream 6 is pumped into a heat exchanging device 7, where it is heated further by an external heat input 15, (the heat used can be waste heat, solar heat, steam, hot solid material, etc.), and leaves the device as relatively hot retentate stream 8. Stream 8 enters the module at the hot side H, and flows through the parallel placed retentate channels 9 in more or less counter-current flow with stream 1. The retentate channels 9 are constructed by the vapour-permeable membranes 10 and the spacer material 11. In these retentate channels, the retentate stream 8 gradually becomes cooler because of evaporation of water vapour, and some heat conduction, through the membranes 11 into the distillate channels 5, where the water vapour condenses forming a pure, liquid distillate 13. The distillate channels are delimited by a membrane 10 at one side and a non-porous condenser wall 3 at the other side. Inside channels 5, a spacer material 12 can be placed. However, this is not strictly necessary in all applications of the present invention. The released heat in the distillate channels 5 is mostly transferred through walls 3 into the feed stream 1, flowing in the feed channels 2. The liquid distillate leaves the module preferably at the cold side C, by which also sensible heat of stream 13 is recovered and transferred into stream 1. It can, however, also be discharged at both sides C and H of the module. This discharge can take place by gravity, pumping, and/or by pressure build up inside channels 5 as a result of the water produced. The relatively cool and concentrated retentate stream leaves the module at the cold side C as stream 14. For a large part of the module, especially the hot side H, the absolute liquid pressure inside the retentate channels 9 is higher than in the corresponding feed channels 2. Typical absolute liquid pressures in the retentate channels range between 1.0 and 4.0 bara.

Figure 2:
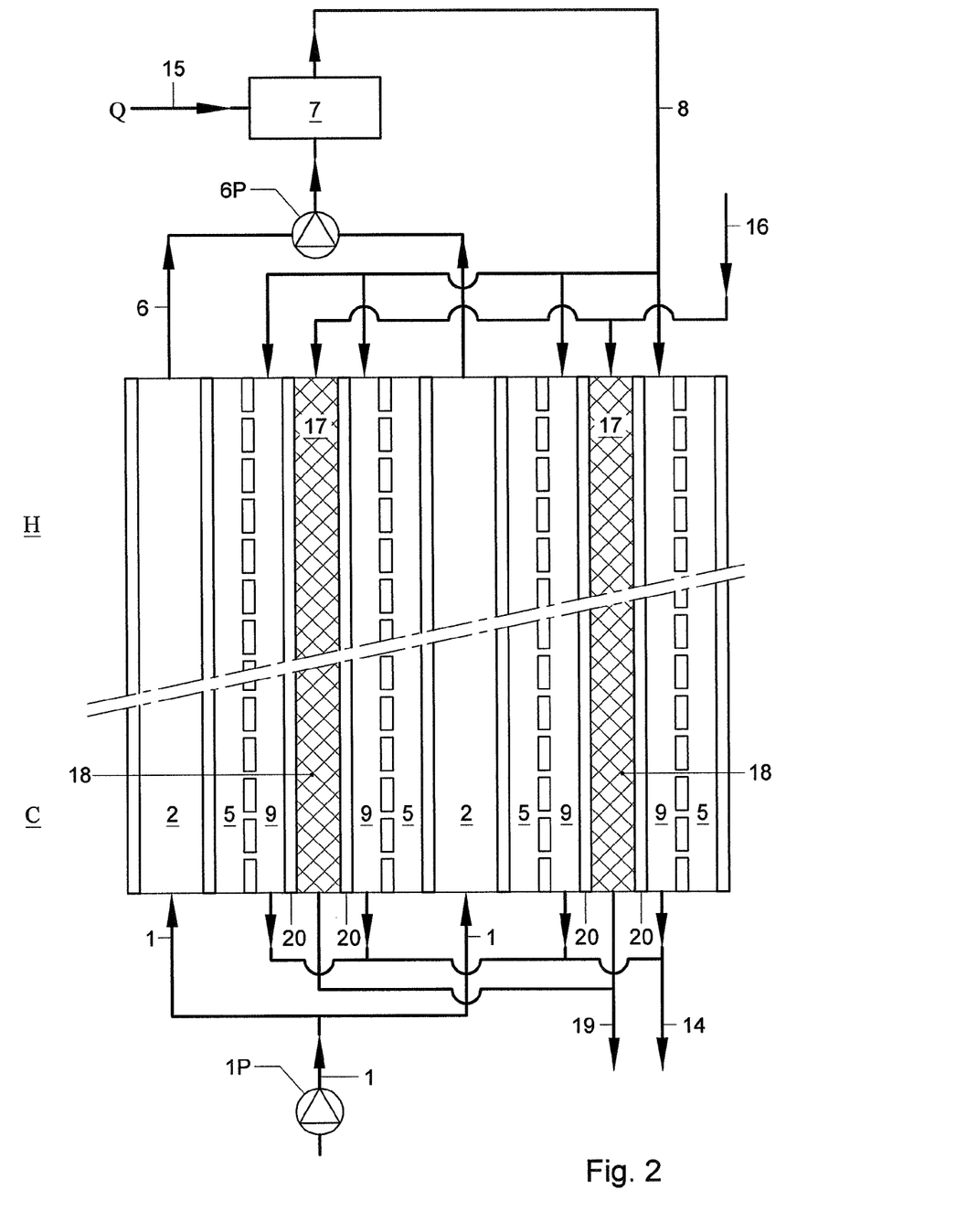

In FIG. 2, a second embodiment of the invention is shown. This embodiment differs from the one shown in FIG. 1 by way of the introduction of a fourth type of channels 17 inside the retentate channels 9. Inside these channels 17, the liquid pressure is preferably equal or higher than the pressure inside the corresponding part of channel 9. This can be established by entering a fluid 16 (liquid or gas or dispersion, etc.) inside these channels 17. Preferably, fluid 16 has a temperature equal or higher than the retentate stream 8 flowing co-currently through channels 9, thus passing heat to stream 8. Channels 17 are constructed by two non-porous, heat-conductive walls 20, made of similar (but not necessarily the same) material as the walls 3, and a spacer material 18.

Figure 4:
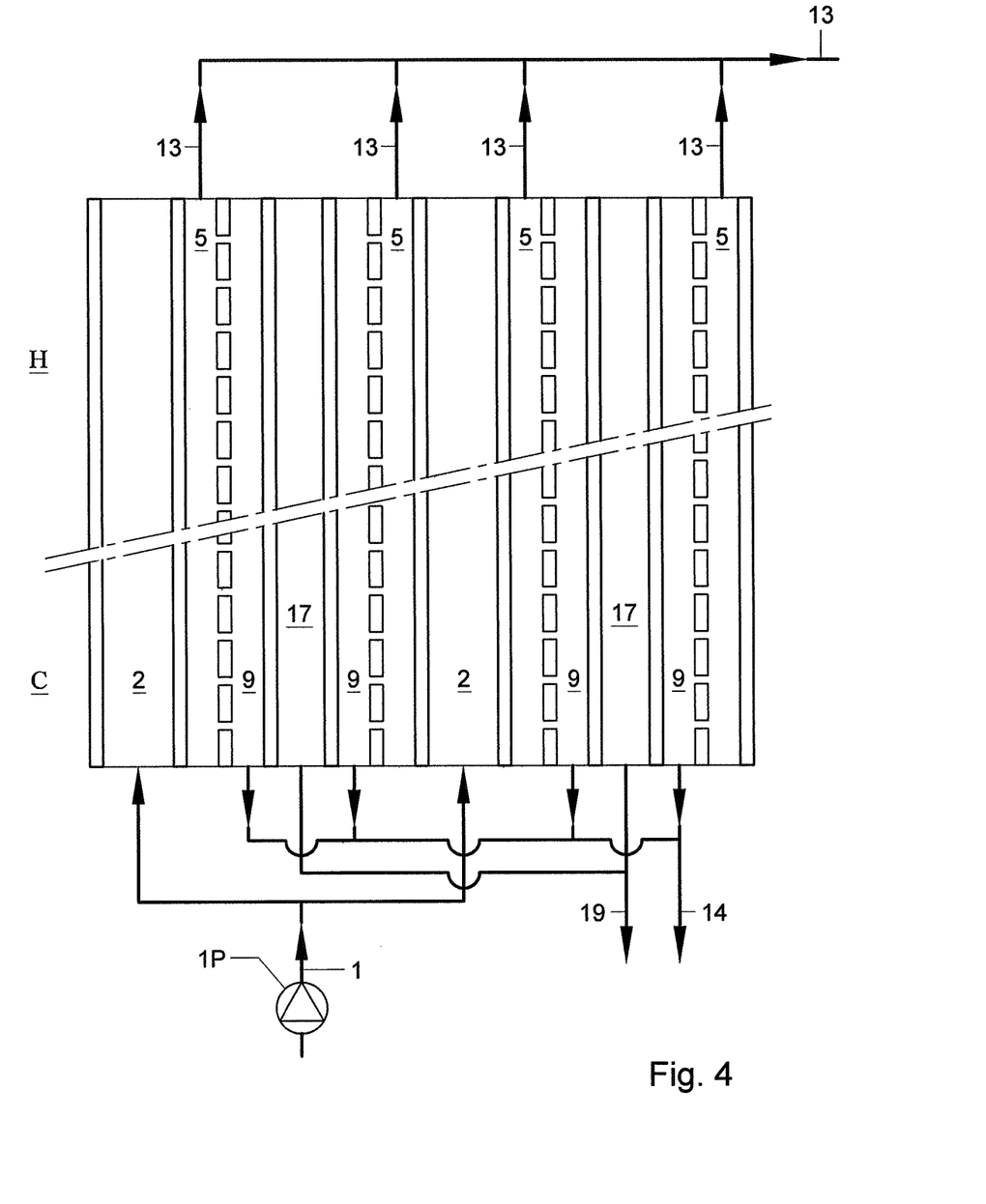

FIGS. 3 and 4 show a third embodiment of the invention, respectively without and with a fourth channel, differing from the embodiments shown in FIGS. 1 and 2 in that the distillate stream 13 is discharged exclusively at the hot side H of the module.

Figure 5:
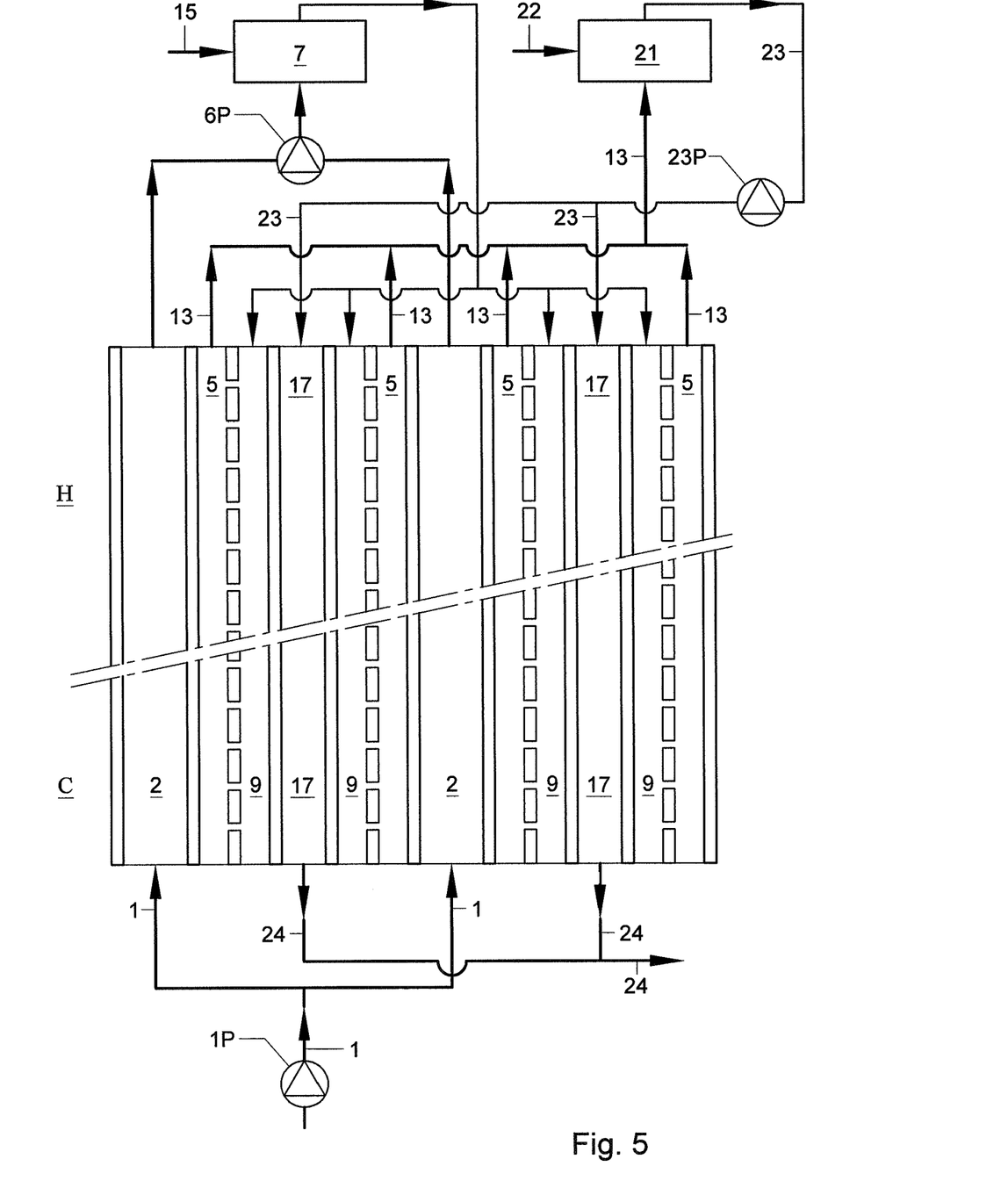

In FIG. 5, a fourth embodiment of the invention is shown, differing from FIGS. 2 and 4 in that the fluid which is pumped into the fourth channels 17 is the distillate stream 13 itself, which is discharged at the hot side H of module according to the third embodiment described above. Said fluid (distillate stream 13) is preferably heated further in a heat exchanging device 21, using a heat input 22 (both can be the same as device 7, respectively heat input 15), and subsequently pumped as heated distillate stream 23 (using if needed pump 23P) into the channels 17. Doing so, most of the heat of stream 23 is transferred to the retentate channels 9, and the cooled distillate leaves the module at the cold side C as stream 24.

Figure 6:
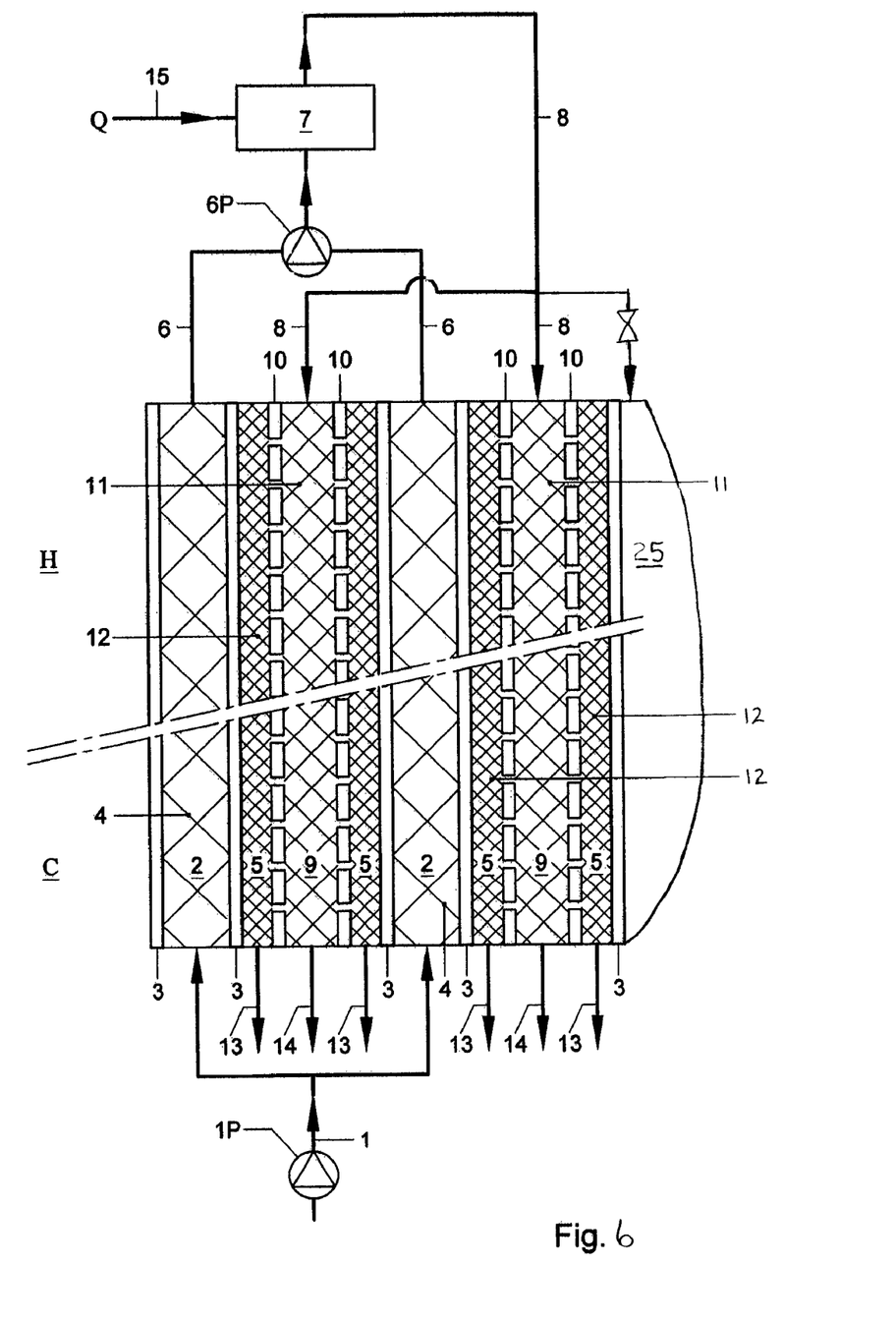

In FIG. 6, an embodiment of the invention is shown, differing from FIG. 1 in that a balloon-like structure 25 made of flexible material is positioned on one side of a segment. Additional pressure can be induced on the membrane/distillate/condenser channels (10/5/3) by introducing into said balloon-like structure 25 a fluid (e.g. the retentate) to increase the volume within the structure 25.

EXAMPLES

Example 1

A membrane distillation module was constructed using 6 PET sheets of thickness 75 μm, width 0.50 m, length 1.50 m, and a polypropylene spacer material of thickness 2 mm to form 3 condenser envelopes, thus 3 feed channels. Further, 4 sheets of porous expanded PTFE (porosity 80%, thickness 120 μm) of similar size were used to form 2 membrane envelopes, within which envelopes 2 extra waste heat channels (the "further channels" 17 of FIG. 2) were placed using 4 additional PET sheets and two PP spacer materials of 0.8 mm thickness. Using within each membrane envelope 2 PP spacer materials of thickness 1.6 mm, a module was obtained having (FIG. 2): four retentate channels 9 around two "further channels" 17, four distillate channels 5, and three feed channels 2.

The total membrane surface area of the module thus obtained was 3.0 m². A membrane distillation experiment with artificial sea water was carried out with this module at a mean temperature in the retentate channels of 55° C., and a mean flow velocity in the retentate channels of ca. 0.04 m/s. Using a State-of-the-Art pressure configuration (i.e. wherein the pressure in the feed channel is higher than the pressure in the retentate channel, contrary to the configuration in accordance with the present invention), the following absolute pressures were measured: P-feed 1=1.56 bara, P-feed 6=1.50 bara, P-retentate 8=1.42 bara, and P-retentate 14=1.08 bara. A specific flux of 1.15 .$10^{-10}$ m³/m²·s·Pa was measured. Using a pressure configuration according to the invention, the following absolute pressures were measured: P-feed 1=0.99 bara, P-feed 6=0.62 bara, P-retentate 8 1.54 bara, and P-retentate 14=1.12 bara. A specific flux of 1.70 .$10^{-10}$ m³/m²·s·Pa was measured; this was almost 50% higher than obtained in accordance with the state-of-the-art process.

Example 2

The same module and process conditions as applied in Example 1 were used, only the feed flow was increased to obtain a mean flow velocity in the retentate channels of 0.06 m/s.

Using a State-of-the-Art pressure configuration (see hereinabove), the following absolute pressures were measured: P-feed 1=2.35 bara, P-feed 6=2.25 bara, P-retentate 8=2.05 bara, and P-retentate 14=1.14 bara. A specific flux of 1.25 .$10^{-10}$ m³/m²·s·Pa was measured. Using a pressure configuration according to the invention, the following absolute pressures were measured: P-feed 1=1.11 bara, P-feed 6=0.73 bara, P-retentate 8=1.35 bara, and P-retentate 14=1.14 bara. A specific flux of 1.75 .$10^{-10}$ m³/m²·s·Pa was measured; this was 40% higher than obtained by means of the state-of-the-art process.

Example 3

The same module and process conditions as applied in Example 2 were used, with the same mean flow velocity in the retentate channels of 0.06 m/s. Only now, the pressure in the "further channels" was increased to a value equal or higher than that in the retentate channels. Using the State-of-the-Art pressure configuration (see hereinabove), the next absolute pressures were measured: P-feed 1=1.93 bara, P-feed 6=1.83 bara, P-retentate 8=1.70 bara, and P-retentate 14=1.12 bara. A specific flux of 1.25 .$10^{-10}$ m³/m²·s·Pa was measured. Using a pressure configuration according to the invention, the following absolute pressures were measured: P-feed 1=0.88 bara, P-feed 6=0.49 bara, P-retentate 8=1.40 bara, and P-retentate 14=1.13 bara. The pressures in the fourth channel were upstream (see line 23) 1.47 bara and downstream (see line 24) 1.38 bara. A specific flux of 1.90 .$10^{-10}$ m³/m²·s·Pa was measured; this was no less than 60% higher when compared with the result obtained in accordance with the state-of-the-art process.

From the above results it will be clear to the skilled person that a considerable improvement is established in accordance with the present invention when compared with the state-of-the-art process.

The invention claimed is:

1. Method for the purification of a liquid by membrane distillation comprising:
   passing a heated vapourising stream of a liquid retentate stream through a retentate channel along a porous hydrophobic membrane, whereby vapour of the liquid flows via the pores of the membrane to the other side of said membrane, and
   condensing said vapour on the other side of said membrane to give a distillate stream in a distillate channel which distillate is created by passing the heat of condensation (latent heat) towards a condenser surface, said condenser surface forming a non-porous separation between a feed stream of the liquid to be purified and said distillate stream, which feed stream is passed through a feed channel in counter-current with the retentate steam and which feed stream is downstream hydraulically connected to the retentate stream, in which feed channel a spacer material is arranged, whereby at least part of the latent heat is transferred via the condenser surface to the feed stream, and whereby a positive liquid pressure difference is applied between the retentate stream and the feed stream at the corresponding points of the retentate channel and the feed channel over at least a part of each of the retentate channel and feed channel.

2. Method according to claim 1, wherein the positive liquid pressure difference is applied between the retentate stream and the feed stream at the corresponding points of the retentate channel and the feed channel over at least 50% of each of the total length of the retentate channel and feed channel.

3. Method according to claim 2, wherein the positive liquid pressure difference is applied between the retentate stream and the feed stream at the corresponding points of the retentate channel and the feed channel over at least 75% of the total length of each of the retentate channel and feed channel.

4. Method according to claim 1, wherein the porous membrane has a thickness between 100 and 600 μm.

5. Method according to claim 4, wherein the porous membrane has a thickness between 125 and 500 μm.

6. Method according to claim 5, wherein the porous membrane has a thickness between 200 and 400 μm.

7. Method according to claim 1, wherein in the retentate channel a further channel is applied through which a fluid stream flows to the retentate stream, whereby the liquid pressure of the fluid stream is equal to or higher than the liquid pressure of the retentate stream.

8. Method according to claim 7, wherein the fluid stream flows through the further channel in co-current with the retentate stream, and the fluid stream heats the retentate stream.

9. Method according to claim 8, wherein the retentate stream is heated by means of residual heat, the residual heat being waste heat or heat derived from warm liquids.

10. Method according to claim 7, wherein the distillate stream is discharged at the hot side of the distillate channel, heat is added to the discharged distillate stream and the heated distillate stream so obtained is passed through the further channel applied in the retentate channel.

11. Method according to claim 1, wherein the distillate stream is discharged at the hot side of the distillate channel, flowing co-currently with the feed stream.

12. Method according to claim 1, wherein the distillate stream is discharged under a higher than atmospheric pressure.

13. Apparatus for purification of a liquid by membrane distillation, which apparatus comprises a segment comprising a feed channel in which a spacer material is arranged, a distillate channel and a retentate channel, whereby the segment has a first distribution chamber for a feed liquid to be supplied, a second distribution chamber located opposite the first distribution chamber for feed liquid to be discharged, a third distribution chamber for retentate stream to be supplied and a fourth distribution chamber opposite the third the third distribution chamber for the retentate stream to be discharged, whereby the segment is provided with a first pump for pumping the feed stream pressure into the segment and a second pump which is arranged downstream the second distribution chamber for pumping the retentate stream under pressure into the retentate channel, the wall between the feed channel and the distillate channel comprises a condenser surface in the form of a non-porous membrane, and the wall between the retentate channel and the distillate channel comprises a porous membrane, and wherein inside the retentate channel a further channel is arranged for allowing a fluid stream to be brought into heat transfer contact with the retentate stream.

14. Apparatus according to claim 13, wherein the porous membrane has a thickness in the range of from 100 to 600 μm.

15. Apparatus according to claim 14, wherein the porous membrane has a thickness in the range of from 125 to 500 μm.

16. Apparatus according to claim 13, wherein the porous membrane has a thickness in the range of from 200 to 400 μm.

17. Apparatus according to claim 13, wherein the apparatus comprises a plurality of segments which are connected in parallel to one another.

18. Apparatus according to claim 17, wherein a first pressure means is arranged upstream of the series of connected segments and one or more further pumps are arranged downstream of the series of connected segments or in between the respective segments that are connected in parallel to each other.

19. Apparatus according to claim 13, wherein one or both sides of the segment(s) comprise an expandable means of which the volume can be increased by introducing into said expandable means a suitable fluid, whereby in operation the increased volume of said means brings about an additional pressure on the membrane/distillate/condenser channels.

* * * * *